United States Patent [19]

Hayashi et al.

[11] Patent Number: 5,084,659
[45] Date of Patent: Jan. 28, 1992

[54] METHOD OF OPERATION OF AIR CLEANER

[75] Inventors: Nobuhiro Hayashi, Shiga; Shuzi Abe, Osaka, both of Japan

[73] Assignee: Matsushita Electric Industrial Co., Ltd., Japan

[21] Appl. No.: 533,643

[22] Filed: Jun. 5, 1990

[30] Foreign Application Priority Data

Jun. 7, 1989 [JP] Japan .................. 1-144589

[51] Int. Cl.$^5$ .................. B03C 3/00; B24F 7/007; B60H 1/24
[52] U.S. Cl. .................. 318/558; 318/449; 55/272; 55/DIG. 34; 165/16; 236/49.1
[58] Field of Search .................. 55/210, 271, 272, 274, 55/467, DIG. 34; 62/132, 157, 161, 177, 178, 179, 239, 243, 244; 165/16; 236/49.1, 49.3; 318/445, 449, 558

[56] References Cited

U.S. PATENT DOCUMENTS 4,992,965  2/1991  Holter et al. .................. 236/49.3 X

FOREIGN PATENT DOCUMENTS

| 59-26318 | 2/1984 | Japan | .................. 165/16 |
| 60-117041 | 6/1985 | Japan | .................. 62/157 |
| 61-287413 | 12/1986 | Japan | .................. 55/271 |
| 63-101643 | 5/1988 | Japan | .................. 236/49.1 |
| 1-118045 | 5/1989 | Japan | .................. 236/49.1 |

Primary Examiner—Bentsu Ro
Attorney, Agent, or Firm—Lowe, Price, LeBlanc & Becker

[57] ABSTRACT

A concentration of a given gas is detected by a gas sensor when a command signal for turning off the gas sensor is present, the concentration is stored and the gas sensor is turned off. The invention detects the concentration of the given gas by the gas sensor when a command signal for turning on the gas sensor is present and determines a reference value by choosing either the stored concentration or the concentration detected after the gas sensor is turned on whichever is lower at an instant a predetermined interval after the gas sensor is turned on. A blower motor of an air cleaner is controlled in accordance with the difference between the reference value and the concentration detected after the gas sensor is turned on. In a second method, the concentration is stored in a nonvolatile memory just before the air cleaner is turned off. In a third method, a given value may be set as the reference value replacing the stored concentration if the given value is smaller than the stored concentration. In a fourth method, only when the stored concentration data is empty, the given value may be used for the reference.

4 Claims, 7 Drawing Sheets

METHOD OF OPERATION OF AIR CLEANER

BACKGROUND OF THE INVENTION

1. Field of the Invention

This invention relates to a method of operation of an air cleaner and particularly to a method of operation of an air cleaner used in a motor vehicle.

2. Description of the Prior Art

An air cleaner which can be used for a motor vehicle comprises an air filter, a blower motor, a gas sensor, and a control circuit for controlling rotation of the blower motor in response to an output of the gas sensor. FIG. 10 is a block diagram of such an air cleaner known in the prior art. In FIG. 10, the control circuit 13 controls the blower motor 15 through a drive transistor 14 in accordance to a sensor output $V_G$ of the gas sensor 12. Only when the engine of the motor vehicle is operating is the gas sensor 12 turned on. This prevents power consumption from the battery because generally, the gas sensor 12 contains a heater requiring large power consumption. The heater of the gas sensor 12 is provided to maintain a temperature of a ceramic catalyst at around 200° C. for detecting a reducing gas through ceramic reducing catalyst reaction.

The gas sensor 12 shows an initial turn-on characteristic, as shown FIG. 11. In FIG. 11, at first, a sensor output $V_G$ increases from turn-on time $t_O$. Then, the sensor output $V_G$ decreases via maximum $V_{GP}$ and reaches to a substantial convergent voltage $V_{GO}$. An interval T is necessary for convergence after turn-on of the gas sensor 12.

The control circuit 13 produces a drive signal in accordance with change of the sensor output $V_G$ with respect to the convergent voltage $V_{GO}$ as a reference. In other words, the convergent voltage $V_{GO}$ is also used for a reference voltage $V_{GO}$. This reference voltage $V_{GO}$ cannot be determined previously because it varies with characteristic deviation, temperature, humidity, and concentration of ambient gases. Thus, it is better that the convergent voltage $V_{GO}$ is determined when the gas sensor 12 is operated. Moreover, detection of concentration of a gas is difficult during the interval T. If concentration of a gas increases during the interval T, the detected sensor output $V_G$ increases. Thus, air pollution cannot be detected and air cleaning is not performed unless the concentration of the gas becomes higher than this detected output $V_G$ as the reference $V_{GO}$. Therefore, there is a drawback that the reference cannot be determined if concentration of gas to be detected is not a normal value during the interval T.

SUMMARY OF THE INVENTION

The present invention has been developed in order to remove the above-described drawbacks inherent to the conventional a method of operation of an air cleaner.

According to the present invention there is provided a first method of operation of an air cleaner. The first method comprises detecting a concentration of a given gas by a gas sensor when a command signal for turning off the gas sensor is present, storing the concentration, and turning off the gas sensor. The concentration of the given gas is also determines by the gas sensor when a command signal for turning on the gas sensor is present. The method determines a reference value by choosing either the stored concentration or the concentration detected after the gas sensor is turned on, whichever is lower at an instant a predetermined interval after the gas sensor is turned on. A blower motor of the air cleaner is then controlled in accordance with the difference between the reference value and the concentration detected after the gas sensor is turned on.

According to the present invention there is also provided a second method of operation of an air cleaner. The second method includes the steps of detecting a concentration of a given gas by a gas sensor when a command signal for turning off the air cleaner is present, storing the concentration in a nonvolatile memory, and turning off the air cleaner. The concentration of the given is also detected gas by the gas sensor when a command signal for turning on the gas sensor is present. The second method determines a reference value by choosing either the stored concentration or the concentration detected in step when a command signal for turning on the gas sensor is present, whichever is lower at an instant that a predetermined interval after the gas sensor is turned on. The second method determines a blower motor of the air cleaner in accordance with the difference between the reference value and the concentration detected after the gas sensor is turned on. In a third method, a given value may be set as the reference value replacing the stored concentration if the given value is smaller than the stored concentration. This given value may be changed by an operator. In a fourth method, only when the stored concentration data is empty, the given value may be used for the reference.

BRIEF DESCRIPTION OF THE DRAWINGS

The objects and features of the present invention will become more readily apparent from the following detailed description taken in conjunction with the accompanying drawings in which.

The same or corresponding elements or parts are designated at like references throughout the drawings.

DETAILED DESCRIPTION OF THE INVENTION

Figure 1:
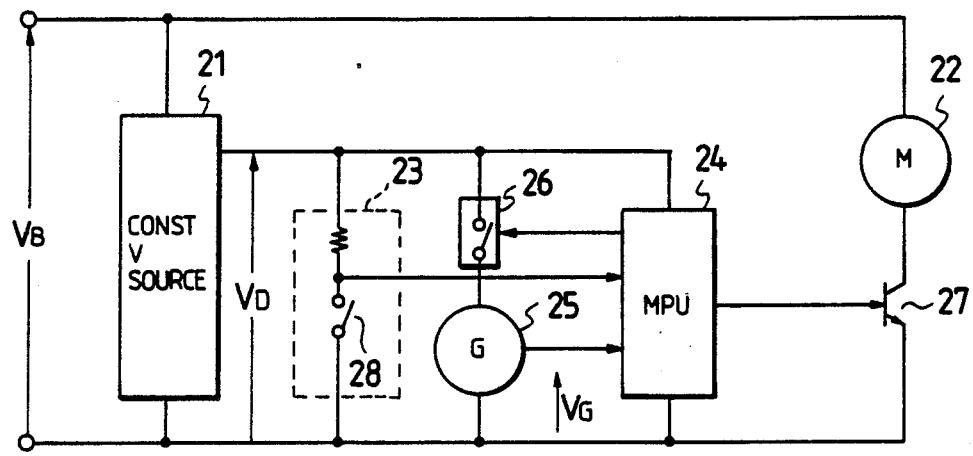
FIG. 1 is a block diagram of a first embodiment of an air cleaner of this invention.

Referring now to the drawings, FIG. 1 is a block diagram of an air cleaner of the invention.

FIG. 1 is a block diagram of a first embodiment of an air cleaner of this invention. In FIG. 1, a supply voltage $V_B$ is applied to a constant voltage source 21 and to a blower motor 22. The constant voltage source 21 supplies a circuit power $V_D$ to an operation circuit 23, a microprocessing unit (MPU) 24, and a gas sensor 25. The operation circuit 23 produces a command signal in response to operation of an operation switch 28 contained therein. The MPU 24 turns on a switch 26 in response to the command signal from the operation circuit 23 to supply the circuit power $V_D$ to the gas sensor 25 and controls a drive transistor 27 driving the blower motor 22 in accordance with a sensor output $V_G$ of the gas sensor 25. The gas sensor 25 detects concentration of reducing gases, such as CO, $CO_2$, $H_2$, alcohol, $NH_3$, etc.

Hereinbelow will be described operation of the air cleaner of the first embodiment with reference to FIGS. 2A and 2B.

Figure 2A:
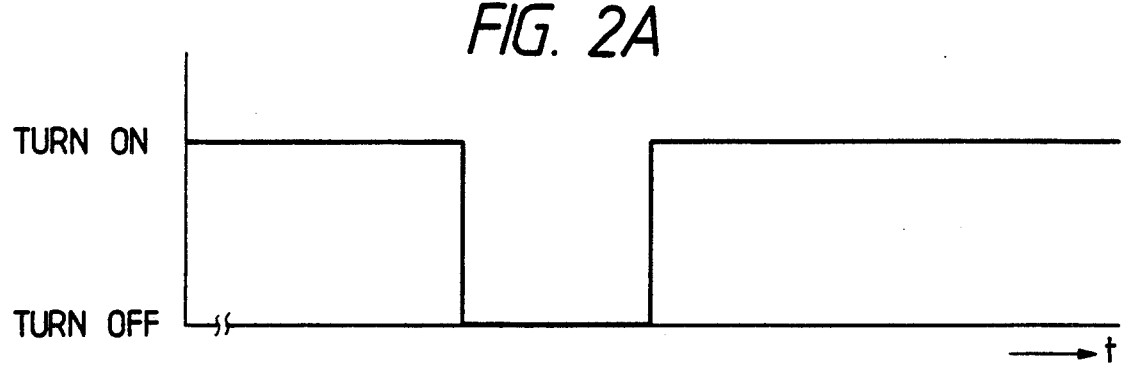
FIG. 2A shows the circuit voltage applied to the gas sensor of FIG. 1.
Figure 2B:
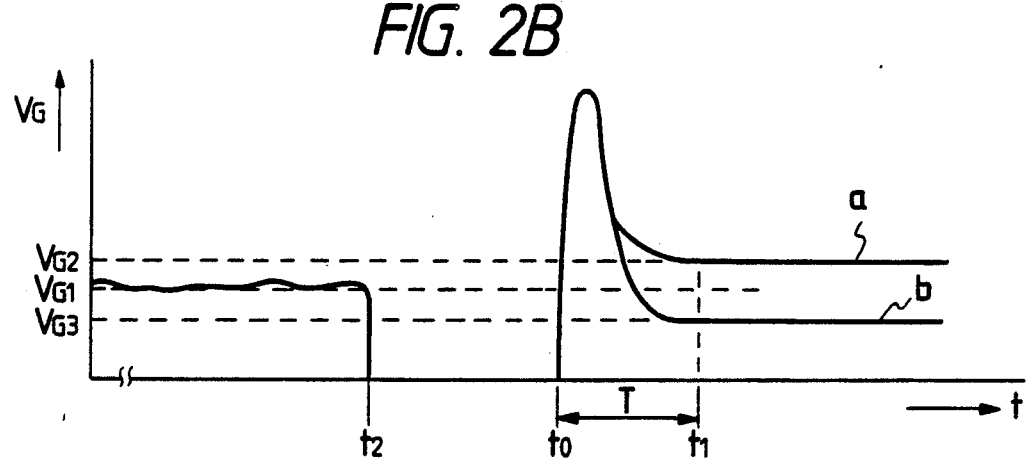
FIG. 2B shows a waveform of the output of the gas sensor 25 of FIG. 1.

FIG. 2A shows state of application of the circuit voltage $V_G$ to the gas sensor 25. FIG. 2B shows a waveform of the sensor output $V_G$ of the gas sensor 25. The MPU 24 which receives the command signal indicative of turning-off at an instant $t_2$ reads out the sensor output $V_G$ of the gas sensor 25, i.e., a value $V_{G1}$ just before turning off of the switch 26. The MPU 24 stores the sensor output $V_G$ in a memory thereof until a next command signal is sent to the MPU 24 to turn on the gas sensor 25 again at instant $t_O$. The MPU 24 turns on the blower motor 22 for an interval T necessary for convergence of the sensor ouput $V_G$ irrespective of the sensor output $V_G$, after resumption of operation of the gas sensor 25. When the sensor output $V_G$ varies as shown by an waveform "a" in FIG. 2B due to an increase in concentration of a detection gas, by smoking, etc., in a compartment in which the air cleaner is installed, the MPU 24 adopts the stored value $V_{G1}$ as reference value because $V_{G1} < V_{G2}$, that is, a lower value indicates true reference value $V_{GO}$. In other words, the MPU does not change reference value $V_{GO}$. When the sensor output $V_G$ varies, as shown by an waveform "b", the MPU 24 adopts the new read out value $V_{G3}$ as reference because $V_{G1} \geq V_{G3}$. In other words, the MPU changes the reference value from value $V_{G1}$ to value $V_{G3}$. Then, the MPU 24 turns off the blower 22 at the time $t_1$. Operation after the instant $t_1$ is the same as that of the conventional operation method.

Figure 3:
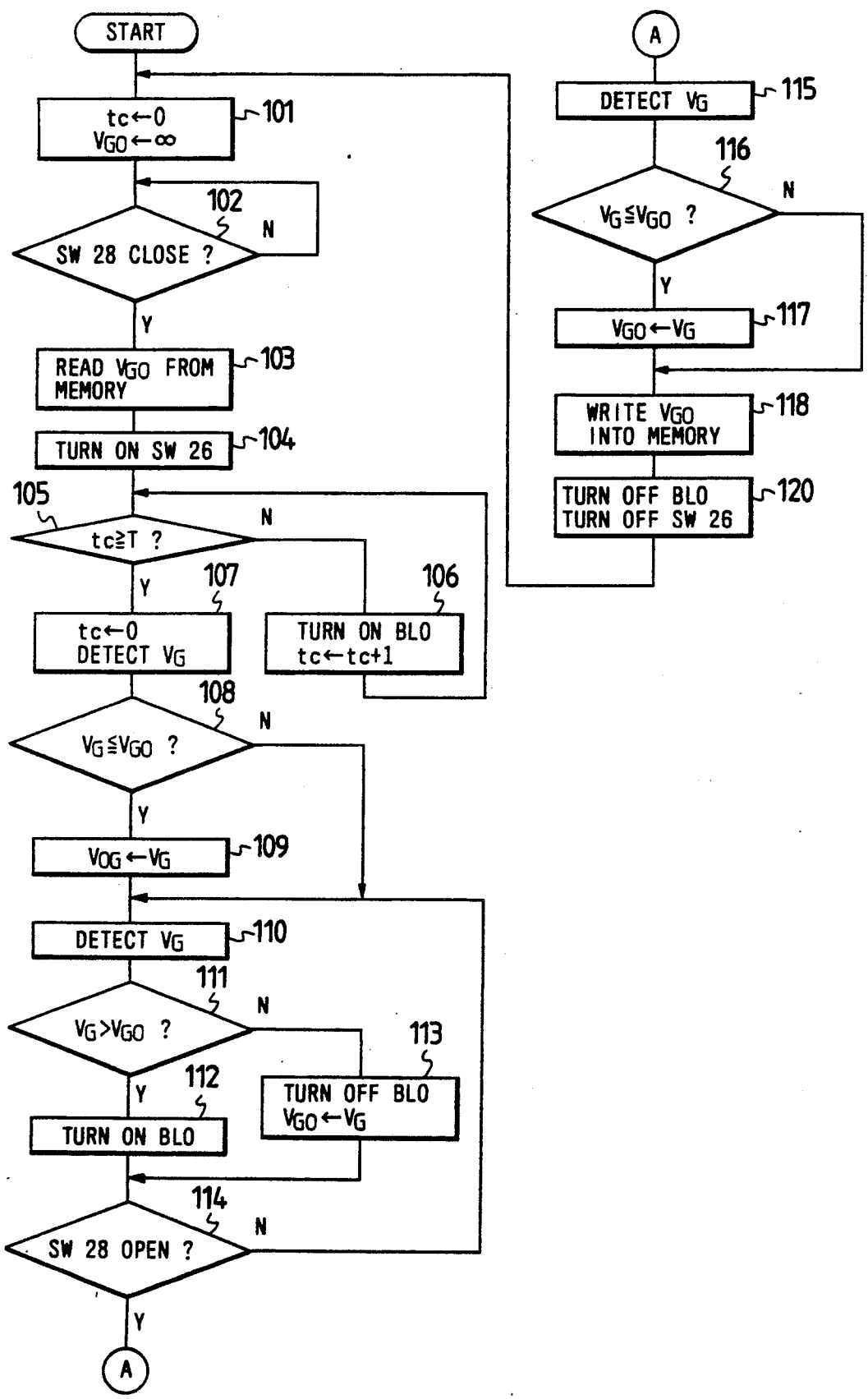
FIG. 3 shows a flow chart of the first embodiment.

The MPU 24 executes the above-mentioned controlling method according to a program stored therein which is shown by a flow chart in FIG. 3. Processing starts at step 101. In step 101, the MPU 24 clears a time count tc and sets a possible largest number to the reference voltage or value $V_{GO}$. In the following step 102, a decision is made as to whether the switch 28 is closed. If NO, the MPU waits until the switch 28 is closed. If YES, the MPU 24 reads out the reference value stored just before turning-off of the gas sensor 25 from the memory in the succeeding step 103 and sets the read out value to the reference value $V_{GO}$. The MPU 24 turns on the switch 26 to supply the circuit voltage to the gas sensor 25 in the following step 104. In the succeeding step 105, a decision is made as to whether the time count tc is larger than predetermined interval T. If NO, the MPU 24 turns on the blower motor 22 and counts up the time count tc. The MPU 24 waits for the interval T in the loop of steps 105 and 106. In step 105, when the answer is YES, the MPU 24 clears the time count tc and detects the sensor output $V_G$ in the following step 107. In the succeeding step 108, a decision is made as to whether the sensor output $V_G$ is equal to or larger than the reference value $V_{GO}$. If YES, the MPU 24 sets the detected sensor output $V_G$ to the reference value $V_{GO}$ in step 109 and processing proceeds to step 110. If NO, processing proceeds to step 110 directly. In step 110, the MPU detects sensor output $V_G$. In the following step 111, a decision is made as to whether the sensor output $V_G$ is larger than the reference value $V_{GO}$. If YES, the MPU 24 turns on the blower motor 22 in step 112 and processing proceeds to step 114. If NO, i.e., the sensor output $V_G$ is smaller than the reference value $V_{GO}$, the MPU 24 turns off the blower motor 22 and sets the detected $V_G$ to the reference value $V_{GO}$ in step 113. Then, processing proceeds to step 114. In step 114, the MPU 24 checks whether the switch 28 is open, i.e., the driver intends to turn off the blower motor 22. If the switch 28 is closed, the processing returns to step 110 and processing loops until the switch 28 is made open. If the switch 28 is open, processing proceeds to step 115. The MPU 24 detects the sensor output voltage $V_G$ in the step 115. In the succeeding step 116, a decision is made as to whether the sensor output $V_G$ is equal to or larger than the reference value $V_{GO}$. If YES, the MPU 24 sets the detected sensor output $V_G$ to the reference value $V_{GO}$ in step 117 and processing proceeds to step 118. If NO, processing proceeds to step 118 directly. In step 118, the MPU 24 writes the reference value $V_{GO}$ into the memory. In the following step 119, the MPU 24 waits for an interval necessary for writing the reference value $V_{GO}$. Then, processing returns to step 101.

Hereinbelow will be described a second embodiment of the invention.

Figure 4:
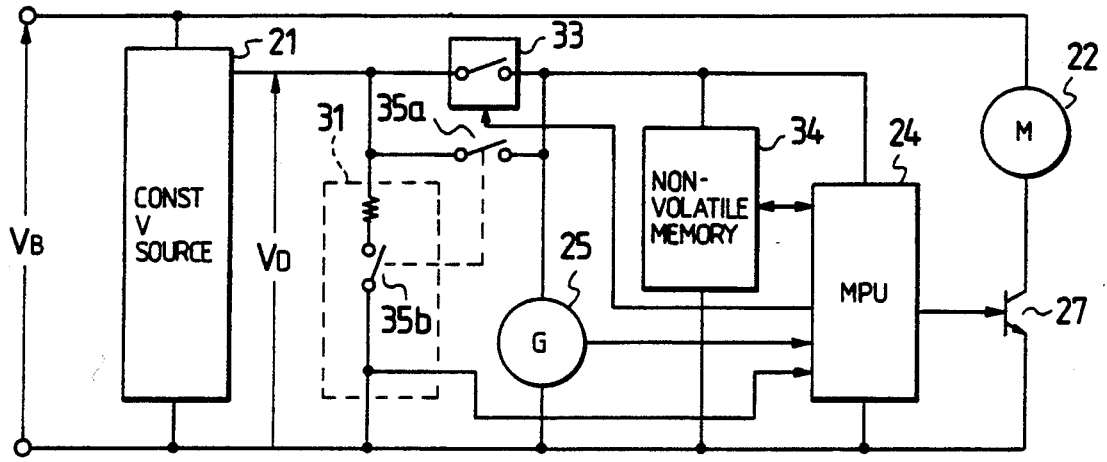
FIG. 4 is a block diagram of a second embodiment of an air cleaner of this invention.

FIG. 4 is a block diagram of a second embodiment of an air cleaner. In FIG. 4, a supply voltage $V_B$ is applied to a constant voltage source 21 and to a blower motor 22. The constant voltage source 21 supplies a circuit power $V_D$ to an operation circuit 23, and through a switch 35a or a switch 33 to an MPU 24, a nonvolatile memory 34, and a gas sensor 25. The operation circuit 31 produces a command signal in response to operation of a toggle switch 35b contained therein. The switches 35a and 35b are mechanically connected to each other. Thus, when the switch 35b is closed, it produces the command signal and the switch 35a supplies the circuit power. The switch 33 is connected to the switch 35a in parallel, which is turned on by the MPU 24 in response to the command signal from the operation circuit 23 and turned off with a delay to maintain the circuit power to the MPU 24 and the nonvolatile memory 34 for an interval necessary for writing data into the nonvolatile memory 34. The MPU 24 controls a drive transistor 27 driving the blower motor 22 in accordance with an output signal $V_G$ of the gas sensor 25. The gas sensor 25 detects concentration of reducing gases, such as CO, $CO_2$, $H_2$, alcohol, $NH_3$, etc.

Basic operation is the same as that of the first embodiment. The difference is that the switches 33 and 35b are turned off when the air cleaner is not operated to save power for the gas sensor and the MPU 32. The data of reference value $V_{GO}$ is stored in a nonvolatile memory 32. The switch 33 is turned off after an interval necessary for saving the reference value $V_{GO}$ into the nonvolatile memory 32.

Figure 5:
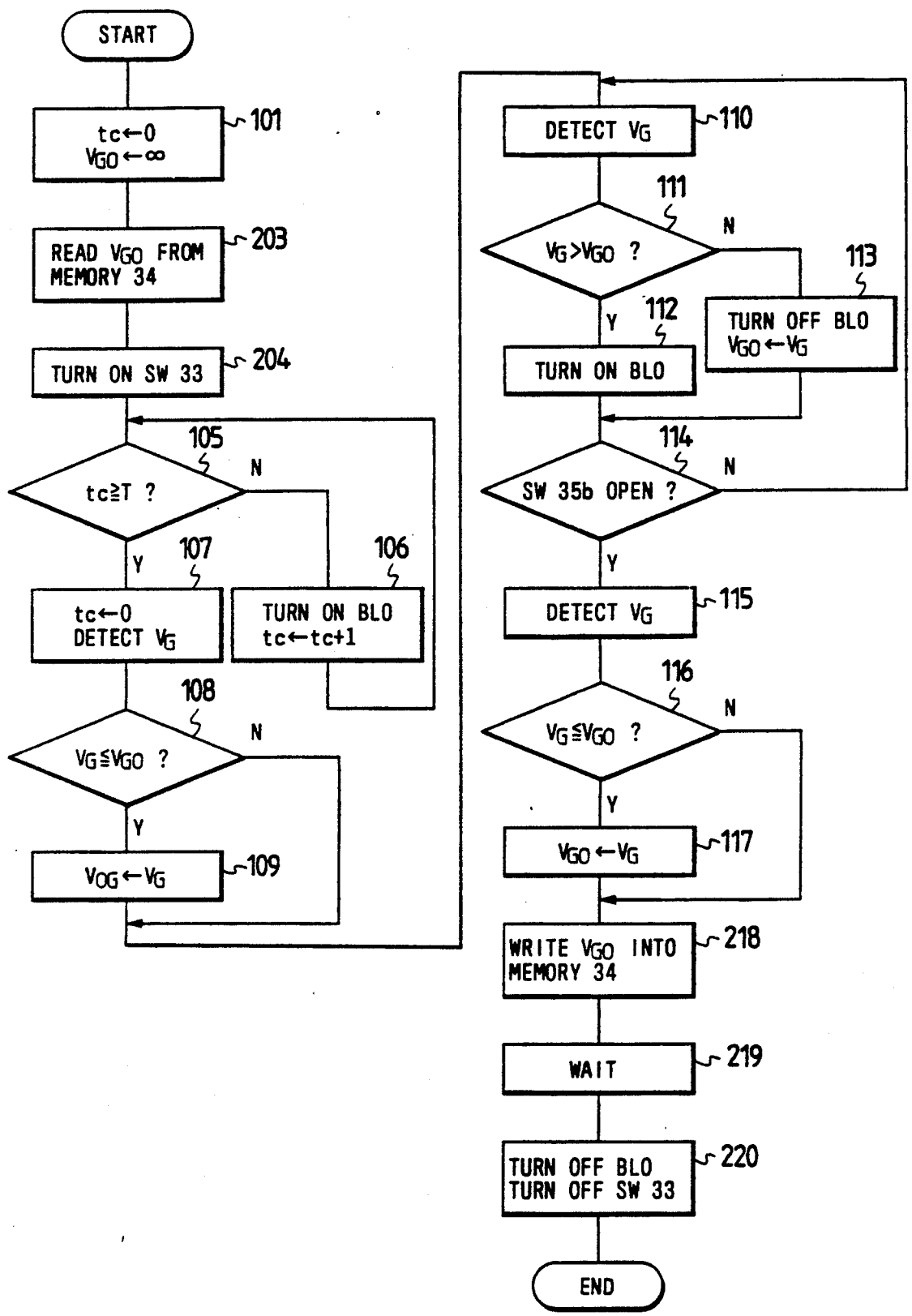
FIG. 5 shows a flow chart of the second embodiment.

The MPU 24 executes the above-mentioned controlling according to a program stored therein which is shown by a flow chart in FIG. 5. Processing starts at step 101. In step 101, the MPU 24 clears a time count tc and set a possible largest number to the reference voltage $V_{GO}$. In the following step 203, the MPU 24 reads out the stored reference value $V_{GO}$ from the nonvolatile memory 34 and sets the read out value to the reference value $V_{GO}$. Then, the MPU 24 turns on the switch 33 in the following step 204. In the following step 105, a decision is made as to whether the time count tc is larger than predetermined interval T. If NO, the MPU 24 turns on the blower motor 22 and counts up the time count tc. The MPU 24 waits for the interval T in the loop of steps 105 and 106. In step 105, when the answer is YES, the MPU 24 clears the time count tc and detects the sensor output $V_G$ in the following step 107. In the succeeding step 108, a decision is made as to whether the sensor output $V_G$ is equal to or larger than the reference value $V_{GO}$. If YES, the MPU 24 sets the detected sensor output $V_G$ to the reference value $V_{GO}$ and processing proceeds to step 110. If NO, processing proceeds to step 110 directly. In step 110, the MPU 24 detects sensor output $V_G$. In the following step 111, a decision is made as to whether the sensor output $V_G$ is larger than the reference value $V_{GO}$. If YES, the MPU 24 turns on the blower motor 22 in step 112 and processing proceeds to step 114. If NO, i.e., the sensor output $V_G$ is smaller than the reference value $V_{GO}$, the MPU 24 turns off the blower motor 22 and sets the detected $V_G$ to the reference value $V_{GO}$. Then, processing proceeds to step 114. In step 114, the MPU 24 checks whether the switch 35b is open, i.e., the driver intends to turn off the blower motor 22. If the switch 35b is closed, the processing returns to step 110 until the switch 35b is made open. If the switch 35b is open, processing proceeds to step 115. The MPU 24 detects the sensor output voltage $V_G$ in the step 115. In the succeeding step 116, a decision is made as to whether the sensor output $V_G$ is equal to or larger than the reference value $V_{GO}$. If YES, the MPU 24 sets the detected sensor output $V_G$ to the reference value $V_{GO}$ in step 117 and processing proceeds to step 218. If NO, processing proceeds to step 218 directly. In step 218, the MPU 24 writes the reference value $V_{GO}$ into the nonvolatile memory 34. In the following step 219, the MPU 24 waits for an interval necessary for writing the reference value $V_{GO}$ into the nonvolatile memory 34. In the succeeding step 220, the MPU 24 turns off the blower motor 22 and turns off the swtich 33. Then, processing ends.

As mentioned above, the air cleaner of the second embodiment provides reduction of power consumption during stop of operation. Further, even if power supply from the battery is turned off due to failure of the battery, etc. during stop of operation of the air cleaner, this air cleaner can operate in the same manner as the first embodiment when power supply resumes.

Hereinbelow will be described a third emboidment of the invention.

Figure 6:
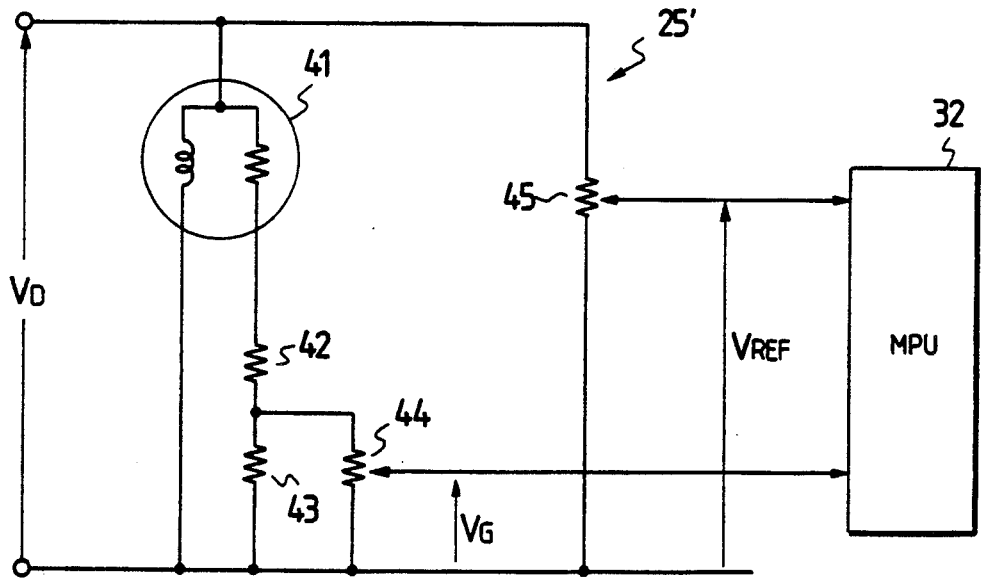
FIG. 6 is a circuit diagram of a gas sensor circuit of a third embodiment.

Basic structure of the third embodiment is the same as that of the second embodiment, so a detailed description is omitted. Differences are as follows:

The gas sendor 25 of the second embodiment is replaced with a gas sensor circuit 25' shown in FIG. 6 as a circuit diagram. The gas sensor circuit 25' produces a sensor output $V_G$ and a reference voltage $V_{REF}$ which is obtained by dividing the circuit power voltage $V_D$ through a variable resistor 45. The sensor output $V_G$ and the reference voltage $V_{REF}$ sent to the MPU 24.

Figure 8A:
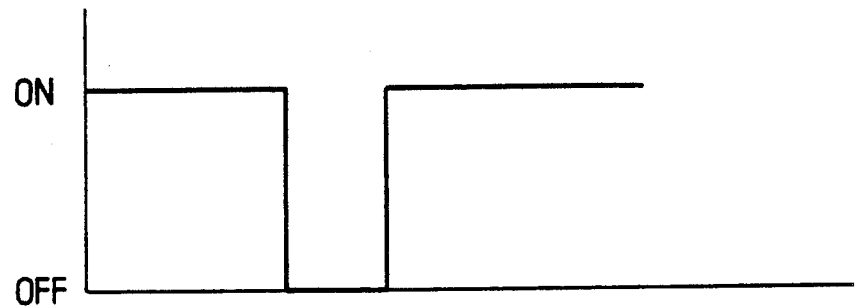
FIG. 8A shows of the circuit voltage applied to the gas sensor of FIG. 6.
Figure 8B:
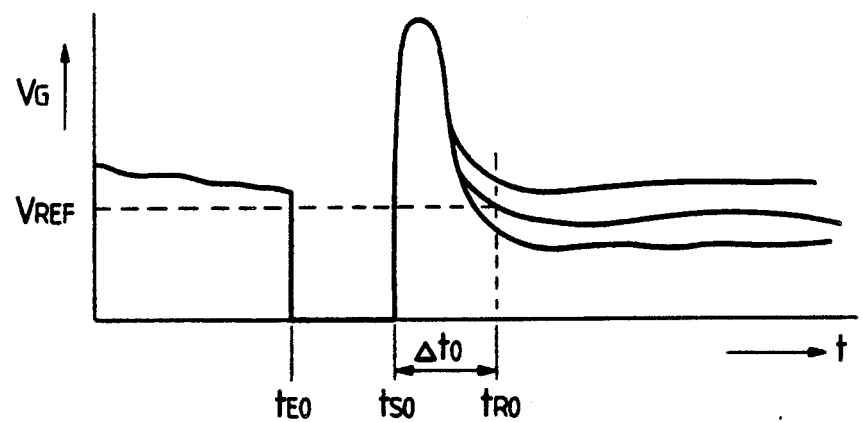
FIG. 8B shows a waveform of the output of the gas sensor 25 of FIG. 6.

FIG. 8A shows the circuit voltage applied to the gas sensor 41. FIG. 8B shows an waveform of the output of the gas sensor 25. The MPU 24 turns on the blower motor 22 at an instant $t_{so}$ and maintains this state for an interval $\Delta t_o$ necessary for convergence of the sensor output $V_G$ after resumption of operation of the gas sensor 25, irrespective of the sensor output $V_G$. The MPU 24 chooses the value which is lower from the sensor output $V_G$ and $V_{REF}$ as reference value at an instant $t_{RO}$.

Figure 7:
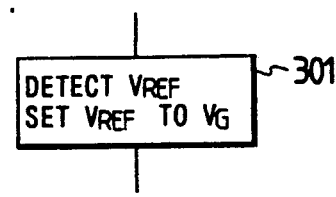
FIG. 7 shows a step of a third embodiment, which replaces with a corresponding step of the flow chart of FIG. 5.

Processing of the MPU 24 of this embodiment is basically the same as that of the second embodiment shown by the flow chart of FIG. 5 is used. However, in this embodiment a flow chart where a step 301 shown in FIG. 7 is replaced with step 103 of FIG. 5 is used. In step 301, the MPU 24 detects $V_{REF}$ and set $V_{REF}$ to a reference value $V_{GO}$. The reference voltage $V_{REF}$ is used as the reference value $V_{GO}$ when $V_G \leq V_{GO}$ in step 108 and other operation is the same as that of the second embodiment. There is an advantage in that the reference voltage $V_{REF}$ is obtained by only turning on the circuit voltage $V_B$ simultaneously. Further, the reference voltage can be changed by adjusting the variable resistor 45 by the driver.

Hereinbelow will be described a fourth embodiment of the invention.

Basic structure of the fourth embodiment is the same as that of the third embodiment, so detailed description is omitted.

Basic operation is the same as that of the third embodiment. There is a difference in that the MPU 24 checks whether a reference value $V_{GO}$ is stored from the last operation. Such operation is as follows:

After starting processing of the MPU 24, a constant value is set to the reference value $V_{GO}$ and then the MPU 24 the stored reference value from the nonvolatile memory 34. It is possible to judge whether the stored reference value $V_{STO}$ is not a true detected sensor output $V_G$ by checking whether the read reference value $V_{GO}$ is equal to the constant value. This constant value is set to a value which does not lie within the range of the detection output $V_G$. Thus, this comparison indicates whether the reference value $V_{GO}$ is stored using detected output $V_G$ at the end of the previous operation.

Figure 9:
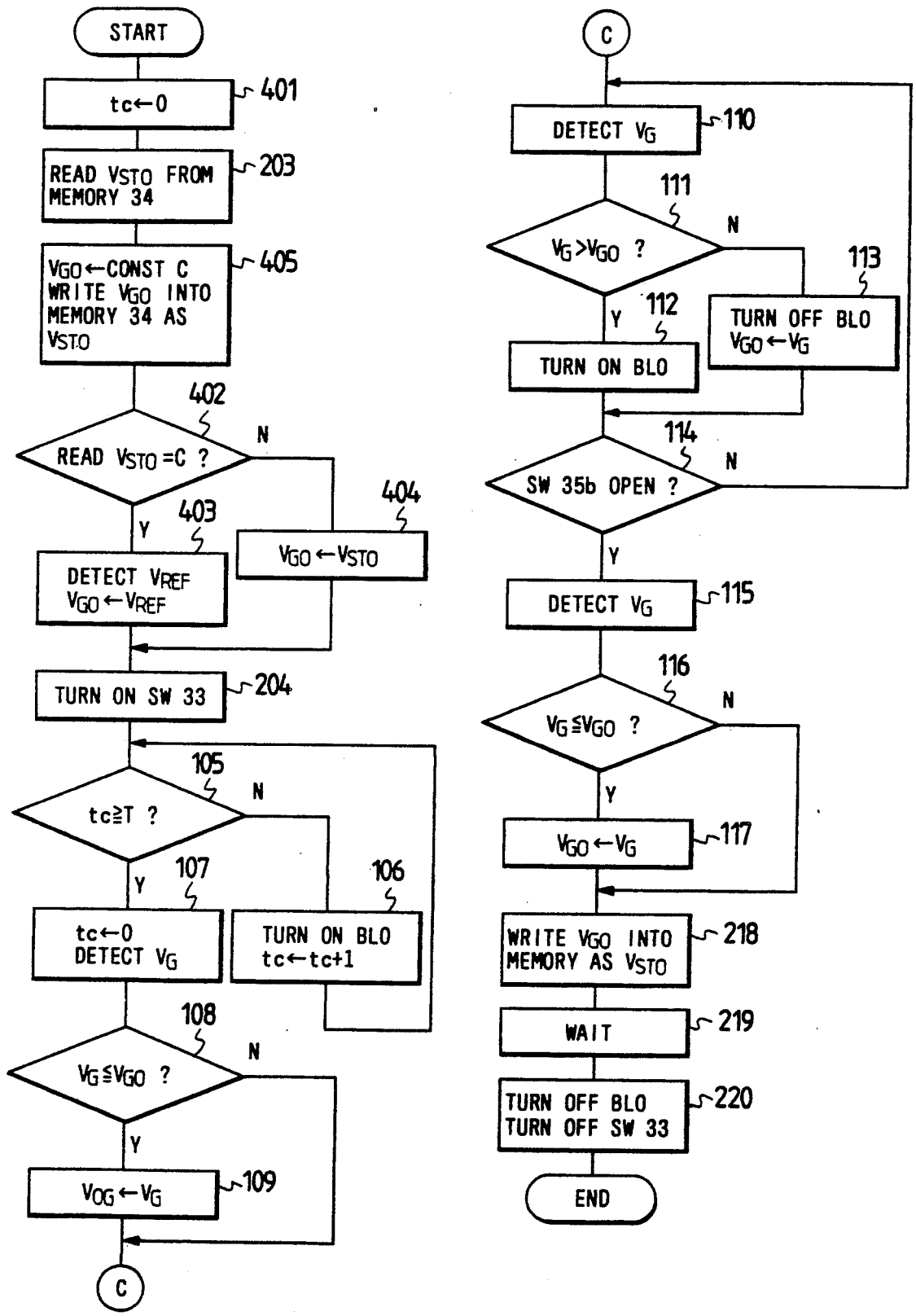
FIG. 9 shows a flow chart of the fourth embodiment.
Figure 10:
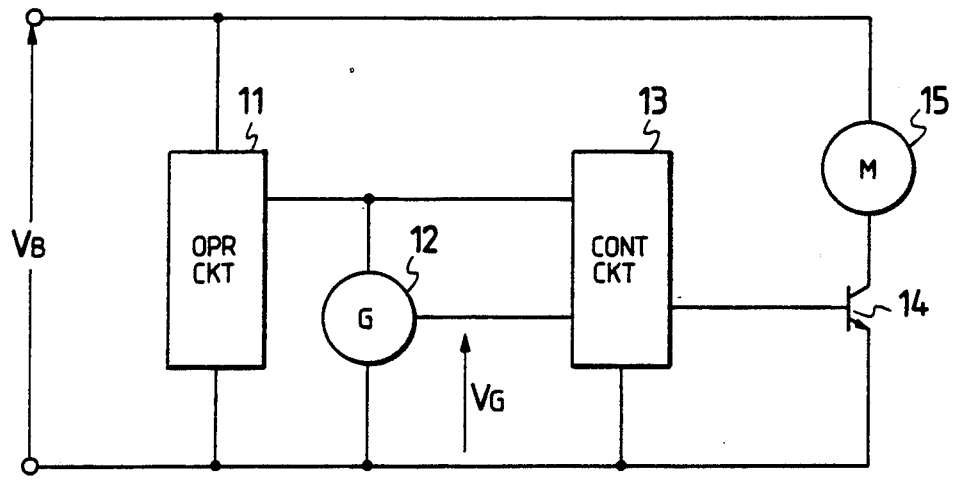
FIG. 10 is a block diagram of a prior art air cleaner.
Figure 11:
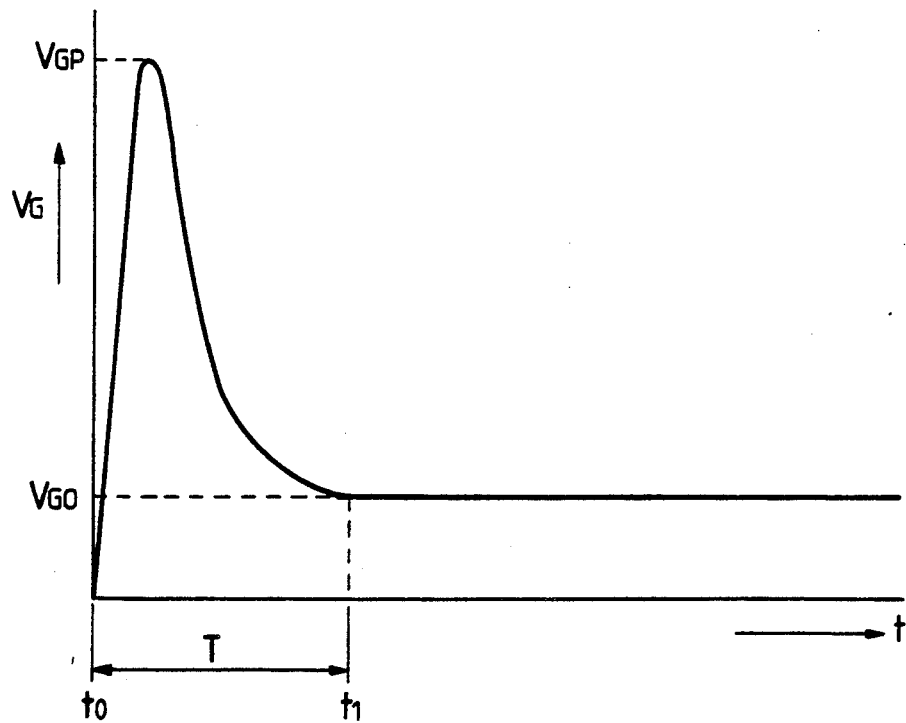
FIG. 11 shows a characteristic curve of a gas sensor of a prior art air cleaner.

The MPU 24 executes the above-mentioned controlling according to a program stored therein which is shown by a flow chart in FIG. 9. Processing starts at step 401. In step 401, the MPU 24 clears a time count tc. In the following step, the MPU 24 reads out the stored reference value $V_{STO}$ from the nonvolatile memory 34. In the succeeding step 405, the MPU 24 sets a constant number C to reference value $V_{GO}$ and writes the reference value $V_{GO}$ into a given address of the volatile memory 34. In the following step 402, a decision is made as to whether the stored reference value $V_{STO}$ in the given address is equal to the constant to check whether a value stored in the given address is stored in step 405 or step 218 described later. If YES, the MPU 24 detects reference voltage $V_{REF}$ and sets the reference voltage $V_{REF}$ to the reference value $V_{GO}$ in step 403. Then processing proceeds to step 204. If NO in step 402, the stored reference value $V_{STO}$ is set to the reference value $V_{GO}$ in step 404 and processing proceeds to step 204. Then, the MPU 24 turns on the switch 33 to supply the circuit voltage to the gas sensor 25 in the following step 204. In the folllowing step 105, a decision is made as to whether the time count tc is larger than predetermined interval T. If NO, the MPU 24 turns on the blower motor 22 and counts up the time count tc. The MPU 24 waits for the interval T in the loop of steps 105 and 106. In step 105, when the answer is YES the MPU 24 clears the time count tc and detects the sensor output $V_G$ in the following step 107. In the succeeding step 108, a decision is made as to whether the sensor output $V_G$ is equal to or larger than the reference value $V_{GO}$. If YES, the MPU 24 sets the detected sensor output $V_G$ to the reference value $V_{GO}$ and processing proceeds to step 110. If NO, processing proceeds to step 110 directly. In step 110, the MPU detects sensor output $V_G$. In the following step 111, a decision is made as to whether the sensor output $V_G$ is larger than the reference value $V_{Go}$. If YES, the MPU 24 turns on the blower motor 22 in step 112 and processing proceeds to step 114. If NO, i.e., the sensor output $V_G$ is smaller than the reference value $V_{GO}$, the MPU 24 turns off the blower motor 22 and sets the detected $V_G$ to the reference value $V_{GO}$. Then, processing proceeds to step 114. In step 114, the MPU 24 checks whether the switch 35b is open, i.e., the driver intends to turn off the blower motor 22. If the switch 35b is closed, the processing returns to step 110 until the switch 35b is made open. If the switch 35b is open, processing proceeds to step 115. The MPU 24 detects the sensor output voltage $V_G$ in the step 115. In the succeeding step 116, a decision is made as to whether the sensor output $V_G$ is equal to or larger than the reference value $V_{GO}$. If YES, the MPU 24 sets the detected sensor output $V_G$ to the reference value $V_{GO}$ in step 117 and processing proceeds to step 218. If NO, processing proceeds to step 218 directly. In step 218, the MPU 24 writes the reference value $V_{GO}$ into the nonvolatile memory 34 as a stored reference value $V_{STO}$. In following step 219, the MPU 24 waits for an interval necessary for writing the reference value $V_{GO}$ into the nonvolatile memory 34. In the succeeding step 220, the MPU 24 turns off the blower motor 22 and turns off the switch 33. Then, processing ends.

As mentioned above, the air cleaner of the fourth embodiment provides reduction of power consumption during stop of operation. Further, if power supply from the battery is turned off due to failure of the battery, etc., this air cleaner can operate in the same manner as the first embodiment. Moreover, if the reference value is not stored during the previous operation, the MPU 24 chooses the value which is smaller for the reference value $V_{GO}$ from the reference voltage $V_{REF}$ and the detection output $V_G$, to prevent error.

What is claimed is:

1. A method of operation of an air cleaner, comprising the steps of:
   (a) detecting a concentration of a given gas using a gas sensor in response to a command signal for turning off said gas sensor to produce a first concentration value;
   (b) storing said first concentration value;
   (c) turning off said gas sensor;
   (d) detecting concentration of said given gas using said gas sensor and producing a second concentration value at an instant a predetermined interval after turning said gas sensor back on;
   (e) determining a reference value by choosing either the stored first concentration value or the second concentration value, whichever is lower; and
   (f) controlling a blower motor of said air cleaner in accordance with the difference between said reference value and a value of detected gas concentration produced after said gas sensor is turned on.

2. A method of operation of an air cleaner, comprising the steps of:
   (a) detecting a concentration of a given gas using a gas sensor in response to a command signal for turning off said air cleaner to produce a first concentration value;
   (b) storing said first concentration value in a nonvolatile memory;
   (c) turning off said air cleaner;
   (d) detecting concentration of said given gas using said gas sensor and producing a second concentration value at an instant a predetermined interval after a turning on of said gas sensor;
   (e) determining a reference value by choosing either said first concentration value or said second concentration value, whichever is lower; and
   (f) controlling a blower motor of said air cleaner in accordance with the difference between said reference value and a value of detected gas concentration produced after said gas sensor is turned on.

3. A method of operation of an air cleaner, comprising the steps of:
   (a) detecting concentration of a given gas using a gas sensor to produce detected concentration values so long as a signal for turning on said gas sensor is present;
   (b) determining a reference value by choosing either a stored concentration value or the detected concentration value, at an instant a predetermined interval after said gas sensor is initially turned on, whichever is lower; and
   (c) controlling a blower motor of said air cleaner in accordance with the difference between said reference value and a current detected concentration value.

4. A method of operation of an aird cleaner, comprising the steps of:
   (a) reading a value from a location in non-volatile memory identified by a given address in response to a command signal for turning on said air cleaner;
   (b) detecting whether the read value is a stored given value or a detected gas concentration value stored during a previous operation of said air cleaner by checking whether said read value is equal to said given value;
   (c) setting a predetermined value as a first reference value if said read value is equal to said given value;
   (d) setting the stored detected gas concentration value as said first reference value if said read value is not equal to said given value;
   (e) detecting a concentration of a given gas using a gas sensor to produce a current detected gas concentration value at an instant a predetermined interval after said gas sensor is turned on;
   (f) determining a second reference value by choosing either said first reference value or said current detected gas concentration value whichever is lower, ; and
   (g) controlling a blower motor of said air cleaner in accordance with the difference between said second reference value and a later detected gas concentration value.

* * * * *

UNITED STATES PATENT AND TRADEMARK OFFICE
CERTIFICATE OF CORRECTION

PATENT NO. : 5,084,659
DATED : January 28, 1992
INVENTOR(S) : Nobuhiro Hayashi et al It is certified that error appears in the above-identified patent and that said Letters Patent is hereby corrected as shown below:

IN THE TITLE PAGE:

The second listed inventor's name should be corrected to read Shuji Abe

Signed and Sealed this

Eighth Day of June, 1993

Attest:

MICHAEL K. KIRK

*Attesting Officer* — Acting Commissioner of Patents and Trademarks